UNITED STATES PATENT OFFICE.

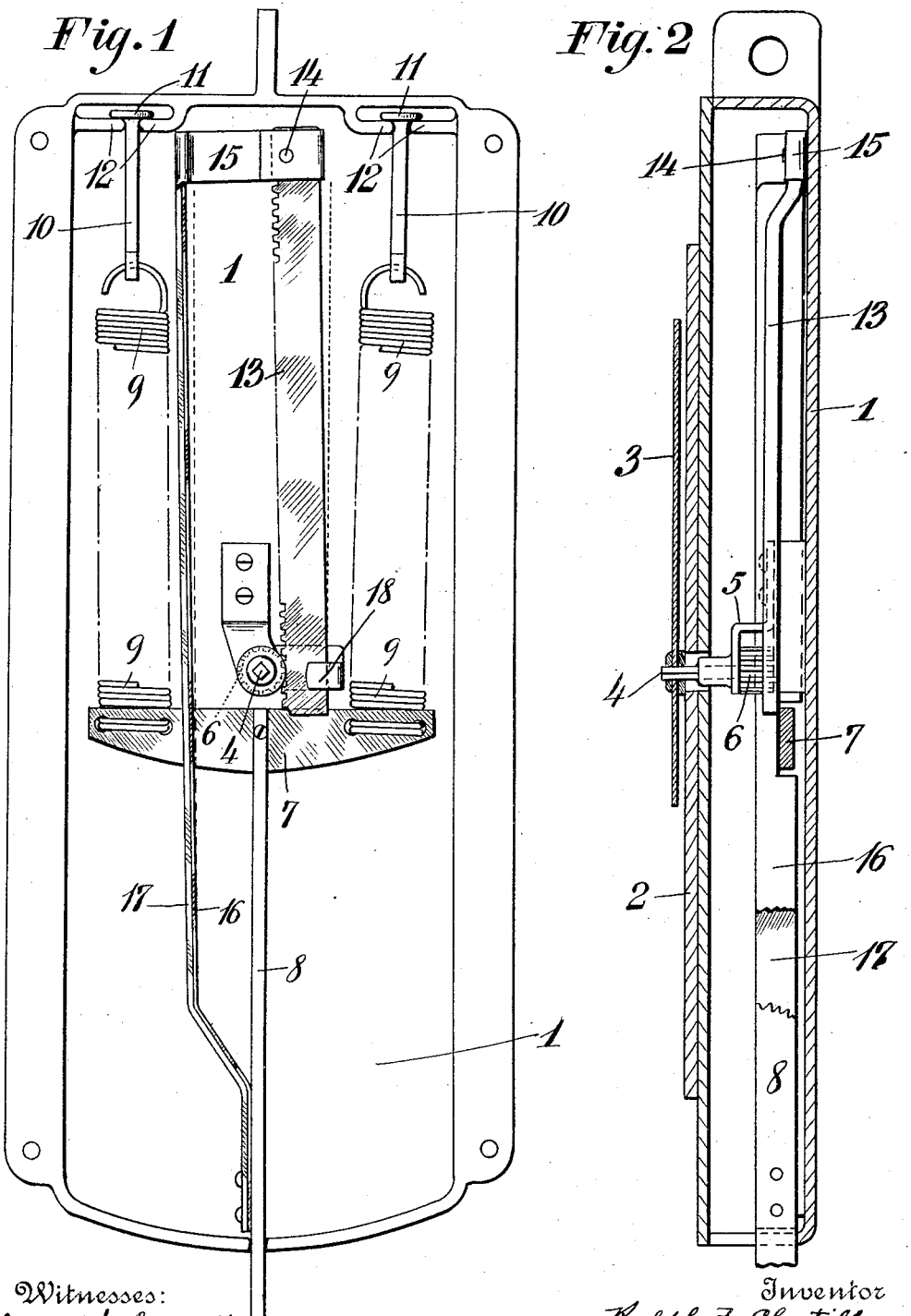

RALPH F. CHATILLON, OF GREENBURG, NEW YORK, ASSIGNOR TO JOHN CHATILLON & SONS, A CORPORATION OF NEW YORK.

SCALE.

1,251,640.

Specification of Letters Patent.

Patented Jan. 1, 1918.

Application filed April 24, 1912. Serial No. 692,990.

*To all whom it may concern:*

Be it known that I, RALPH F. CHATILLON, a citizen of the United States, residing at Greenburg, in the county of Westchester and State of New York, have invented certain new and useful Improvements in Scales, of which the following is a full, clear, and exact specification.

This invention relates to scales, and has particular reference to means for compensating for temperature variations in spring balances.

In the ordinary well-known forms of spring balances, wherein the beam is connected to one or more coil springs, and to the pointer through multiplying gearing, a slight variation in the resistance or tension of the spring due to variation of temperature will, by reason of the multiplied connection between the pointer and the beam, cause a material variation in the weight registered on the dial or scale by the pointer. It is the object of this invention to combine a thermostat with a scale in such manner that the rack or other suitable gear element which actuates the pointer will be varied in effective length as the temperature varies, so that a given weight will produce the same movement of the pointer on the dial or scale, independently of the temperature of the spring. For example, as the temperature of a coil spring increases, its strength will diminish, so that a given weight will stretch the spring more at the higher temperature than it will at a lower temperature, thereby producing a greater movement of the pointer and indicating a greater weight. The reverse also holds true, such a spring scale not indicating in low temperature the true weight, the variation increasing as the gear ratio between the beam and the pointer increases. In spring scales of the rack and pinion type, such as specifically shown herein, I propose to compensate for temperature variations by varying the angle between the pitch line of the rack and the line of pull of the weight by means of a thermostat, so that as the temperature increases these lines approach parallelism, thereby tending to reduce the effective movement of the rack, and increasing this angle as the temperature lowers and thereby increasing the movement of the pinion which is connected to the pointer.

As shown herein, I provide a dial or scale and pointer of any suitable well-known form, which is actuated by a movable rack, the rack, instead of being directly connected with the beam as heretofore, being connected therewith through a thermostat which in the form shown herein varies the position of the rack on the gear independently of the pointer according to the temperature. As the angle between the pitch line of the rack and the line of movement of the beam increases, a greater throw will be given to the pointer, and vice versa, the movement of the pointer for a given movement of the beam being a minimum when the line of movement of the rack is parallel to the line of movement of the beam. I have discovered that this principle can be availed of in scales for correcting temperature variations, so that the weight registered will be independent of the temperature of the spring.

In the accompanying drawings, Figure 1 is an elevation of a scale embodying the invention; and Fig. 2 is an elevation partly in section.

1 represents a case of suitable form having a dial 2 provided with a suitable scale for registering weights. 3 represents the pointer carried by a stud shaft 4 journaled in the hanger 5 carried by the casing, the shaft 4 carrying the driving pinion 6. 7 represents the beam, carrying the bar 8, to which a hook, scale pan or the like is attached. The bar 8 is suitably guided by the casing so as to have a substantially vertical movement. 9, 9 represent coil springs attached to the beam 7 at the lower ends and to the frame 1 at the upper ends, as by links 10 having heads 11 detachably engaging lugs 12. These parts are all well known and may be varied in any desired manner.

13 represents the rack, which, when moved in a vertical direction, revolves the pinion 6 and the pointer 3, but this rack 13, instead of being directly connected with the bar 8 as heretofore, is connected therewith indirectly through a thermostatically operated connection 15. The rack 13 is preferably pivotally connected at 14 to the bar 15 at the upper end, and the bar 15 is carried by the free end of a thermostat which consists, in the form herein shown, of an iron bar 17 and a brass bar 16 rigidly connected together, and at the lower end connected to the bar 8. The upper end of the thermostat moves laterally to the right when the temperature increases, and to the left when the temperature decreases, thereby moving the upper end of the rack relatively to the lower end. The more the upper end of the rack 13 is moved to the left by decrease in temperature of the thermostat, the greater arc of movement will be imparted to the pinion 6 by a given weight, the pitch line of the rack forming the hypotenuse of a triangle whose vertical side is parallel to the line of movement of the bar 7. The more the rack is deflected to the right by increase in temperature, the less the angle at the apex of the triangle becomes, and consequently less teeth of the rack will engage with the pinion during a given movement of the bar 7. Briefly, the rack always forms the hypotenuse of the triangle and the thermostat varies the length of this hypotenuse, thus effecting the desired temperature correction in the scale. 18 is a guide for the lower end of the rack, and tending to hold it in engagement with the pinion. Various modifications and changes may be made without departing from the scope of the invention.

Having thus described my invention, I declare that what I claim as new and desire to secure by Letters Patent is:—

1. A scale comprising weight supporting mechanism, indicating means, an operating pinion therefor, a rigid rack for actuating said pinion, and a thermostat connecting the weight supporting mechanism and the rack for moving the rack bodily according to temperature and transmitting the actuating force between the weight supporting mechanism and the pinion.

2. A scale comprising a weighing spring, a weight supporting member carried by said spring, weight indicating means, an operating pinion therefor, a rigid rack for rotating said pinion, and connections in part rigid and in part thermostatic connecting the weight supporting mechanism and the rack for moving the rack bodily according to temperature and transmitting the actuating force between the weight supporting mechanism and the pinion.

3. A scale comprising a spring, a movable beam connected to the spring, a pointer having an operating pinion, a movable gear element for actuating said pinion, and a thermostat connecting the beam and said movable gear element for maintaining a predetermined movement of the pointer with a movement of the gear element varying with the temperature.

4. A scale comprising a spring, a movable beam connected to the spring, a pointer having an operating pinion, a rigid rack and meshing with said pinion, and a thermostat for automatically moving the rack angularly relatively to the pinion.

5. A scale comprising a spring, a movable beam connected to the spring, a pointer having an operating pinion, a rack engaging the pinion, and a thermostat connected to the beam and to the opposite end of the rack.

In testimony whereof I affix my signature, in presence of two witnesses.

RALPH F. CHATILLON.

Witnesses:
J. S. WOOSTER,
G. N. KERR.

Copies of this patent may be obtained for five cents each, by addressing the "Commissioner of Patents, Washington, D. C."